(12) United States Patent  
Sasao

(10) Patent No.: US 11,948,737 B2  
(45) Date of Patent: Apr. 2, 2024

(54) SOLENOID

(71) Applicant: DENSO CORPORATION, Kariya (JP)

(72) Inventor: Kazuhiro Sasao, Kariya (JP)

(73) Assignee: DENSO CORPORATION, Kariya (JP)

(*) Notice: Subject to any disclaimer, the term of this patent is extended or adjusted under 35 U.S.C. 154(b) by 290 days.

(21) Appl. No.: 17/566,230

(22) Filed: Dec. 30, 2021

(65) Prior Publication Data

US 2022/0122754 A1   Apr. 21, 2022

Related U.S. Application Data

(63) Continuation of application No. PCT/JP2020/026647, filed on Jul. 8, 2020.

(30) Foreign Application Priority Data

Jul. 18, 2019  (JP) .................... 2019-132578

(51) Int. Cl.
*H01F 7/16*      (2006.01)
*H01F 7/08*      (2006.01)
*F16K 31/06*     (2006.01)

(52) U.S. Cl.
CPC ........... *H01F 7/1607* (2013.01); *H01F 7/081* (2013.01); *F16K 31/0675* (2013.01); *H01F 2007/086* (2013.01)

(58) Field of Classification Search
CPC .............................. H01F 7/1607; F16K 31/06
USPC ........................................................ 335/279
See application file for complete search history.

(56) References Cited

U.S. PATENT DOCUMENTS

| | | | | |
|---|---|---|---|---|
| 8,134,436 | B2* | 3/2012 | Yasoshima | H01F 7/127 335/220 |
| 8,154,370 | B2* | 4/2012 | Ishibashi | H01F 7/1615 335/220 |
| 8,814,136 | B2* | 8/2014 | Mizui | F16K 27/048 335/220 |
| 8,994,484 | B2* | 3/2015 | Ando | H01F 7/081 335/236 |
| 9,076,583 | B2* | 7/2015 | Ando | H01F 7/127 |
| 9,646,754 | B2* | 5/2017 | Saiki | F16K 31/0675 |
| 2006/0243938 | A1 | 11/2006 | Ishibashi et al. | |

(Continued)

FOREIGN PATENT DOCUMENTS

JP   2011-228568   11/2011  
JP   2015-135135   7/2015

(Continued)

*Primary Examiner* — Alexander Talpalatski  
(74) *Attorney, Agent, or Firm* — Nixon & Vanderhye P.C.

(57) ABSTRACT

A solenoid includes a coil portion, a yoke having a side portion and a bottom portion, a plunger, and a stator core. The stator core has a magnetic attraction core and a sliding core which has a tubular core portion and a first magnetic flux transfer portion formed from the tubular core portion and the core end portion toward an outside in a radial direction to transfer magnetic flux between the yoke and the core portion. A breathing groove communicating an inside and an outside of the first magnetic flux transfer portion in the radial direction is formed on at least one of a first facing surface facing the bottom portion in a first magnetic flux transfer portion and a second facing surface facing the first magnetic flux transfer portion at the bottom portion so as to be positioned in a vertical direction when the solenoid is assembled.

5 Claims, 7 Drawing Sheets

(56) References Cited

U.S. PATENT DOCUMENTS

2009/0140192 A1\* 6/2009 Yamamoto ......... G05D 16/2026
  251/129.15
2012/0291900 A1\* 11/2012 Mizui ................. F15B 13/0442
  137/625.64

FOREIGN PATENT DOCUMENTS

| JP | 2016-149416 | 8/2016 |
| JP | 2017-161014 | 9/2017 |
| JP | 2018-170470 | 11/2018 |
| JP | 2019-087599 | 6/2019 |

\* cited by examiner

US 11,948,737 B2

SOLENOID

CROSS REFERENCE TO RELATED APPLICATIONS

This application is a continuation application of International Patent Application No. PCT/JP2020/026647 filed on Jul. 8, 2020, which designated the U.S. and based on and claims the benefits of priority of Japanese Patent Application No. 2019-132578 filed on Jul. 18, 2019. The entire disclosure of all of the above applications is incorporated herein by reference.

TECHNICAL FIELD

The present disclosure relates to a solenoid.

BACKGROUND

Conventionally, a solenoid has a coil that generates a magnetic force when energized, a stator core provided inside the coil, and a plunger that slides inside the stator core.

SUMMARY

A technique capable of suppressing an entry of foreign matter into a plunger chamber while suppressing an increase in a side force is desired.

The present disclosure can be realized as the following embodiments.

According to one aspect of the present disclosure, a solenoid is provided. The solenoid includes a coil portion generating a magnetic force when energized, a yoke having a side surface portion along an axial direction and a bottom portion formed along a direction intersecting the axial direction, and accommodating the coil portion, a columnar plunger that slides in the axial direction, and a stator core.

The stator core has a magnetic attraction core arranged in the axial direction to face a distal end surface of the plunger and configured to attract magnetically the plunger by a magnetic force generated by the coil portion, a sliding core having a cylindrical core portion that is disposed inside the coil in a radial direction perpendicular to the axial direction and accommodates the plunger, and a first magnetic flux transfer portion that is formed from a core end, which is an end of the core portion in the axial direction and faces the bottom portion, toward an outside in the radial direction, and is configured to transfer the magnetic flux between the yoke and the core portion, and a magnetic flux passage suppressing portion configured to suppress passage of magnetic flux between the sliding core and the magnetic attraction core.

A second magnetic flux transfer portion is disposed radially outside a magnetic attraction core end, which is an end in the axial direction of the magnetic attraction core and is opposite to a side facing the distal end surface, and is configured to transfer the magnetic flux between the magnetic attraction core and the side surface portion.

A breathing groove communicating an inside and an outside of the first magnetic flux transfer portion in the radial direction is formed on at least one of a first facing surface facing the bottom portion in the first magnetic flux transfer portion and a second facing surface facing the first magnetic flux transfer portion at the bottom portion so as to be positioned in a vertical direction when the solenoid is assembled.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
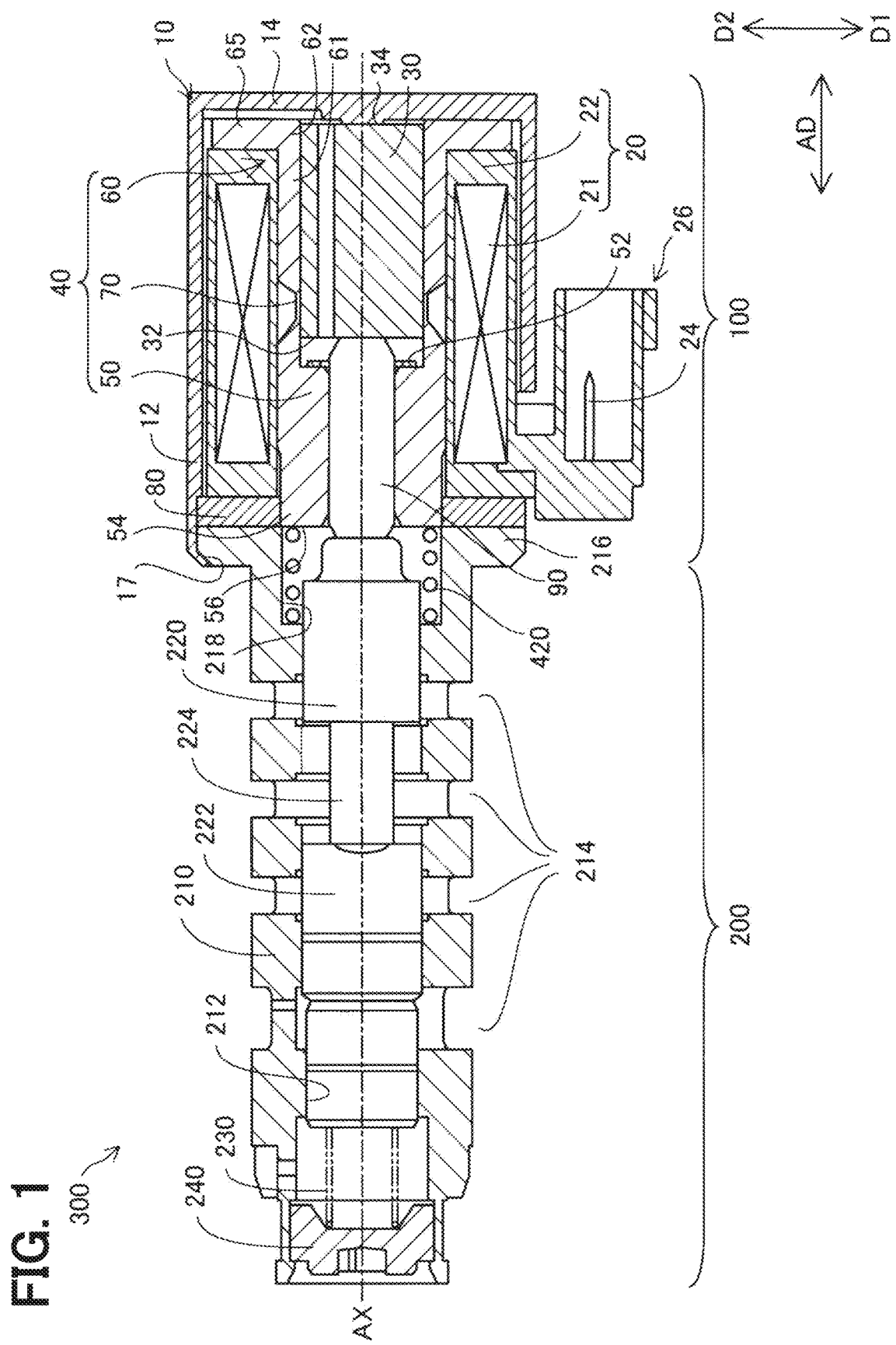
FIG. 1 is a cross-sectional view showing a schematic configuration of a linear solenoid valve to which a solenoid according to a first embodiment is applied.

In an assumable example, a solenoid has a coil that generates a magnetic force when energized, a stator core provided inside the coil, and a plunger that slides inside the stator core. In the solenoid, a magnetic ring core is arranged on an outer periphery of the stator core. As a result, a magnetic circuit component such as a yoke and the stator core are magnetically coupled via a ring core, and a decrease in magnetic force due to an assembly gap between the magnetic circuit component and the stator core is suppressed.

In the solenoid, a ring core is configured to be movable in a radial direction. If the ring core is assembled eccentrically with respect to a sliding core, a deviation in the radial direction may occur depending on a size of a gap between the sliding core and the ring core. As a result, in a distribution of a magnetic flux transmitted to the sliding core and a plunger through the ring core, the deviation in the radial direction may occur, and an attractive force in the radial direction may be generated as a side force. If the side force increases, the slidability of the plunger may deteriorate. Further, when a foreign substance enters a plunger chamber, the slidability of the plunger may be deteriorated. Therefore, a technique capable of suppressing the entry of foreign matter into the plunger chamber while suppressing the increase in the side force is desired.

The present disclosure can be realized as the following embodiments.

According to one aspect of the present disclosure, a solenoid is provided. The solenoid includes a coil portion generating a magnetic force when energized, a yoke having a side surface portion along an axial direction and a bottom portion formed along a direction intersecting the axial direction, and accommodating the coil portion, a columnar plunger that slides in the axial direction, and a stator core.

The stator core has a magnetic attraction core arranged in the axial direction to face a distal end surface of the plunger and configured to attract magnetically the plunger by a magnetic force generated by the coil portion, a sliding core having a cylindrical core portion that is disposed inside the coil in a radial direction perpendicular to the axial direction and accommodates the plunger, and a first magnetic flux transfer portion that is formed from a core end, which is an end of the core portion in the axial direction and faces the bottom portion, toward an outside in the radial direction, and is configured to transfer the magnetic flux between the yoke and the core portion, and a magnetic flux passage suppressing portion configured to suppress passage of magnetic flux between the sliding core and the magnetic attraction core.

A second magnetic flux transfer portion is disposed radially outside a magnetic attraction core end, which is an end in the axial direction of the magnetic attraction core and is opposite to a side facing the distal end surface, and is configured to transfer the magnetic flux between the magnetic attraction core and the side surface portion.

A breathing groove communicating an inside and an outside of the first magnetic flux transfer portion in the radial direction is formed on at least one of a first facing surface facing the bottom portion in the first magnetic flux transfer portion and a second facing surface facing the first magnetic flux transfer portion at the bottom portion so as to be positioned in a vertical direction when the solenoid is assembled.

According to the solenoid of the embodiment described above, the sliding core has the tubular core portion arranged radially outside the plunger and the magnetic flux transfer portion formed from the core end of the core portion toward the outside in the radial direction to transfer the magnetic flux. Therefore, there is almost no radial gap between the core portion 61 and the magnetic flux transfer portion. It is possible to prevent the core portion and the magnetic flux transfer portion from being eccentric. In addition, due to such eccentricity, it is possible to suppress the occurrence of radial bias in the distribution of the magnetic flux transmitted from the magnetic flux transfer portion to the plunger 30 via the core portion. Therefore, it is possible to suppress an increase in side force due to a bias in the distribution of magnetic flux. In addition, a breathing groove communicating an inside and an outside of the first magnetic flux transfer portion in the radial direction is formed on at least one of a first facing surface facing the bottom portion and a second facing surface facing the first magnetic flux transfer portion at the bottom portion so as to be positioned in a vertical direction when the solenoid is assembled. Therefore, a foreign matter that has flowed from the outside of the solenoid to the inside of the solenoid passes through a relatively long path in order to reach the breathing groove. For example, if an inflow portion that allows the fluid existing in the solenoid mounting environment to flow into the inside of the solenoid is formed so as to be in a direction different from a top direction when the solenoid is assembled, foreign matter that has flowed in from a direction different from the vertical direction passes through a relatively long path to reach the breathing groove formed in the vertical direction. Further, for example, even when the inflow portion is formed so as to be in the vertical direction when the solenoid is assembled, the foreign matter tends to move vertically downward according to gravity, so that the foreign matter passes a long path to reach the breathing groove formed in the vertical direction. As described above, since the maze structure of a long path can be realized as the passage path of the foreign matter, it is possible to suppress the foreign matter from entering the plunger chamber in which the plunger is housed, and it is possible to suppress the deterioration of the slidability of the plunger. Therefore, it is possible to suppress the entry of foreign matter into the plunger chamber while suppressing the increase in the side force.

The present disclosure can be realized as the following embodiments. For example, the present disclosure can be realized in the embodiment of a solenoid valve, a method of manufacturing a solenoid, and the like.

A. First Embodiment

A-1. Constitution

A solenoid 100 according to the first embodiment shown in FIG. 1 is applied to a linear solenoid valve 300 and functions as an actuator for driving a spool valve 200. The linear solenoid valve 300 is configured to control a hydraulic pressure of hydraulic oil supplied to a vehicle automatic transmission (not shown), and is mounted on a valve body provided on an outer surface of a transmission case (not shown). The linear solenoid valve 300 of the present embodiment is used by being assembled to a valve body so that a position of a connector 26 described later in a circumferential direction is on a ground direction D1 side. In the present embodiment, the "ground direction D1" means not only a vertical downward direction indicated by the arrow in FIG. 1, but also the vertical downward direction rather than a horizontal direction. The position of the connector 26 in the circumferential direction is determined according to a mounting condition of the linear solenoid valve 300. FIG. 1 schematically shows a cross section of the linear solenoid valve 300 taken along a central axis AX.

Figure 2:
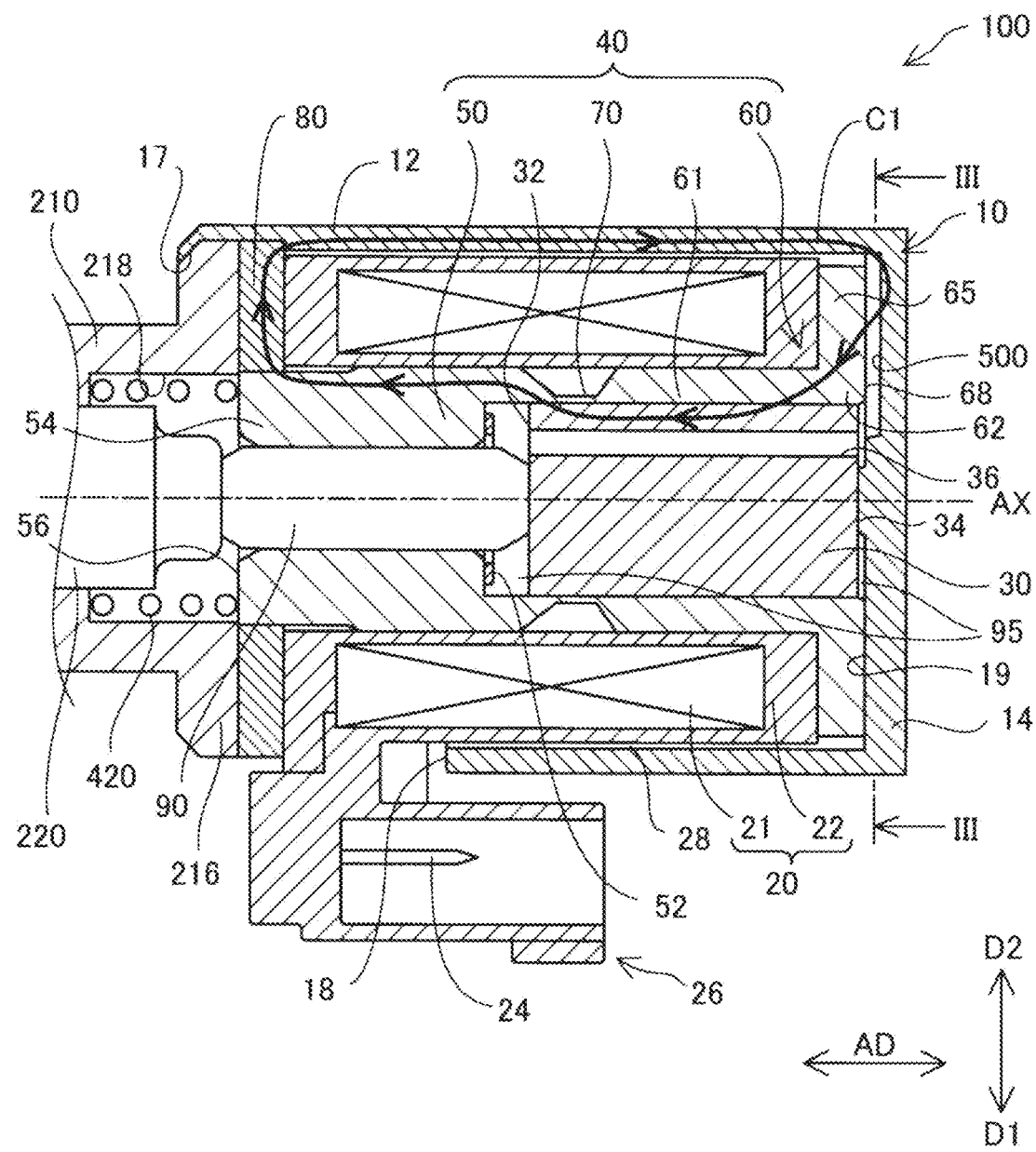
FIG. 2 is a cross-sectional view showing a detailed configuration of a solenoid.

The linear solenoid valve 300 includes the spool valve 200 and the solenoid 100 arranged side by side along the central axis AX. FIGS. 1 and 2 show the solenoid 100 and the linear solenoid valve 300 in a non-energized state. Although the linear solenoid valve 300 of the present embodiment is a normally closed type, it may be a normally open type.

The spool valve 200 shown in FIG. 1 adjusts an opening area of a plurality of oil ports 214 described later. The spool valve 200 includes a sleeve 210, a spool 220, a spring 230, and a spring load adjusting member 240.

The sleeve 210 has a substantially cylindrical external shape. The sleeve 210 is formed with an insertion hole 212 penetrating along the central axis AX and a plurality of oil ports 214 communicating with the insertion hole 212 and opening in a radial direction. The spool 220 is inserted into the insertion hole 212. An end of the insertion hole 212 on the solenoid 100 side is formed to have an enlarged diameter and functions as an elastic member accommodating portion 218. An elastic member 420 described later is accommodated in the elastic member accommodating portion 218. The plurality of oil ports 214 are formed side by side along a direction parallel to the central axis AX. The direction is hereinafter, referred to as "axial direction AD". The plurality of oil ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the spool 220 based on the output hydraulic pressure. The drain port discharges the hydraulic oil. A flange 216 is formed at an end of the sleeve 210 on the solenoid 100 side. The flange 216 has a diameter that increases radially outward, and is fixed to a yoke 10 of the solenoid 100 described later. In the present embodiment, a radial direction means a direction orthogonal to the axial direction AD.

The spool 220 has a plurality of large-diameter portions 222 and small-diameter portion 224 arranged side by side along the axial direction AD, and has a substantially rod-like external shape. The spool 220 slides along the axial direction AD inside the insertion hole 212, and adjusts the opening area of the plurality of oil ports 214 according to a position along the axial direction AD between the large-diameter portion 222 and the small-diameter portion 224. A shaft 90 for transmitting a thrust of the solenoid 100 to the spool 220 is in contact with the end of the spool 220 on the solenoid 100 side. The spring 230 is arranged at the other end of the spool 220. The spring 230 is configured by a compression coil spring, and presses the spool 220 in the axial direction AD to urge the spool 220 toward the solenoid 100. The spring load adjusting member 240 is arranged in contact with the spring 230, and adjusts the spring load of the spring 230 by adjusting an amount of screwing into the sleeve 210.

The solenoid 100 shown in FIGS. 1 and 2 is energized by an electronic control unit (not shown) to drive the spool valve 200. The solenoid 100 includes a yoke 10, a coil portion 20, a plunger 30, a stator core 40, a ring member 80, and the elastic member 420.

The yoke 10 is made of a magnetic metal, and forms an outer shell of the solenoid 100 as shown in FIG. 2. The yoke 10 has a bottomed cylindrical external shape, and accommodates the coil portion 20, the plunger 30, and the stator core 40. The yoke 10 has a side surface portion 12, a bottom portion 14, an opening 17, and a notch 18.

The side surface portion 12 has a substantially cylindrical external shape along the axial direction AD, and is disposed radially outside the coil portion 20.

The bottom portion 14 is formed at the end of the side surface portion 12 and perpendicular to the axial direction AD at the end of the side surface portion 12 opposite to the end opposite to the spool valve 200, and closes the end of the side surface portion 12. The bottom portion 14 is not always formed perpendicular to the axial direction AD, and may be formed substantially perpendicularly, or may be formed to intersect with the axial direction AD according to the shape of a magnetic flux transfer portion 65 described later. The bottom portion 14 faces a base end surface 34 of the plunger 30 described later. A detailed description of the bottom portion 14 will be described later. In the following description, a space surrounded by the bottom portion 14, the stator core 40, and the shaft 90 is also referred to as a "plunger chamber 95". The plunger chamber 95 houses the plunger 30.

The opening 17 is formed at an end of the side surface portion 12 on the spool valve 200 side. The opening 17 is caulked and fixed to the flange 216 of the spool valve 200 after the components of the solenoid 100 are assembled inside the yoke 10. The spool valve 200 and the yoke 10 may be fixed by using an arbitrary method such as welding, instead of fixing by caulking.

The notch 18 is formed by cutting out a part in the circumferential direction of the opening 17. The notch 18 of the present embodiment is formed at a position in the circumferential direction which is the ground direction D1 in a state where the solenoid 100 is assembled (hereinafter, also referred to as an "assembled state"). More specifically, the notch 18 is formed at a position in a vertical downward direction, but is not always formed in the vertical downward direction, but the notch 18 may be formed at a position rotated by 45° with respect to the vertical downward direction and at an angle of less than 90° with respect to the vertical downward direction. The connector 26, which will be described later, is exposed from the yoke 10 via the notch 18. Further, the notch 18 functions as an inflow for flowing a fluid existing in a mounting environment of the solenoid 100 from the outside of the solenoid 100 into the inside of the solenoid 100. The fluid existing in the mounting environment of the solenoid 100 corresponds to a fluid such as hydraulic oil or air. The fluid that has flowed into the solenoid 100 through the notch 18 flows out to the outside of the solenoid 100 through the notch 18.

The coil portion 20 is arranged inside the side surface portion 12 of the yoke 10 in the radial direction. The coil portion 20 generates a magnetic force when energized, and generates a loop-shaped magnetic flux passing through the side surface portion 12 of the yoke 10, the bottom portion 14 of the yoke 10, the stator core 40, the plunger 30, and the ring member 80. (the loop-shaped magnetic flux is hereinafter, referred to as a "magnetic circuit"). In the state shown in FIGS. 1 and 2, the energization of the coil portion 20 is not performed and a magnetic circuit is not formed. For convenience of explanation, a part of the magnetic circuit C1 formed when the energization of the coil portion 20 is performed is schematically indicated by a thick arrow in FIG. 2.

The coil portion 20 has a coil 21 and a bobbin 22. The coil 21 is formed of a conducting wire having an insulating coating. The bobbin 22 is made of resin, and the coil 21 is wound around the bobbin 22. The bobbin 22 is connected to the connector 26 arranged on the outer periphery of the yoke 10. The connector 26 is exposed from the yoke 10 through the notch 18. A connection terminal 24 to which the end of the coil 21 is connected is arranged inside the connector 26. The connector 26 electrically connects the solenoid 100 to the electronic control device via a connection line (not shown).

An outer diameter of the coil portion 20 is formed to be smaller than an inner diameter of the side surface portion 12 of the yoke 10. With such a configuration, a radial gap is formed over the entire circumference between the inner surface of the side surface portion 12 and the outer surface of the coil portion 20, and the radial gap functions as a breathing path 28 that communicates a radial outside of a magnetic flux transfer portion 65 which will be described later with an outside of the solenoid 100. The breathing path 28 communicates with the outside of the solenoid 100 through the notch 18 of the yoke 10 so as to circulate the fluid existing in the mounting environment of the solenoid 100. For example, in the mounting environment of the solenoid 100, when the notch 18 is immersed in the hydraulic oil, the hydraulic oil as a fluid is circulated, and when the notch 18 is located vertically above the storage level of the hydraulic oil, the air as a fluid is circulated.

The plunger 30 is housed in the plunger chamber 95. The plunger 30 has a substantially cylindrical external shape and is made of a magnetic metal. The plunger 30 slides in the axial direction AD on an inner peripheral surface of a core portion 61 of the stator core 40 described later. The above-described shaft 90 is disposed in contact with an end surface of the plunger 30 on the spool valve 200 side (hereinafter, also referred to as a "distal end surface 32"). Thereby, the plunger 30 is urged toward the bottom portion 14 side of the yoke 10 along the axial direction AD by the urging force of the spring 230 transmitted to the spool 220 shown in FIG. 1. As shown in FIG. 2, an end surface of the plunger 30 opposite to the distal end surface 32 (hereinafter, also referred to as a "base end surface 34") faces the bottom portion 14 of the yoke 10. The plunger 30 is formed with a breathing hole 36 penetrating in the axial direction AD. The breathing hole 36 allows the fluid located on the base end surface 34 side and the distal end surface 32 side of the plunger 30 to flow in the plunger chamber 95.

The Stator core 40 is made of a magnetic metal, and is disposed between the coil portion 20 and the plunger 30. The stator core 40 is configured by a member in which a magnetic attraction core 50, a sliding core 60, and a magnetic flux passage suppressing portion 70 are integrated.

The magnetic attraction core 50 is disposed so as to surround the shaft 90 in a circumferential direction. The magnetic attraction core 50 constitutes a portion of the stator core 40 on the spool valve 200 side, and magnetically attracts the plunger 30 by the magnetic force generated by the coil portion 20, A stopper 52 is disposed on a surface of the magnetic attraction core 50 facing the distal end surface 32 of the plunger 30. The stopper 52 is made of a non-magnetic material, and suppresses a direct contact between the plunger 30 and the magnetic attraction core 50, and also prevents the plunger 30 from being separated from the magnetic attraction core 50 due to the magnetic attraction.

The sliding core 60 constitutes a portion of the stator core 40 on the bottom portion 14 side, and is disposed radially outside the plunger 30. The sliding core 60 has a core portion 61 and a magnetic flux transfer portion 65. In the present embodiment, the core portion 61 and the magnetic flux transfer portion 65 are integrally formed.

The core portion 61 has a substantially cylindrical shape, and is arranged between the coil portion 20 and the plunger 30 in the radial direction. The core portion 61 guides the movement of the plunger 30 along the axial direction AD. As a result, the plunger 30 slides directly on an inner peripheral surface of the core portion 61. There is a sliding gap (not shown) between the core portion 61 and the plunger 30 for ensuring the slidability of the plunger 30. An end portion of the sliding core 60 that is located on an opposite side to the magnetic attraction core 50 side (hereinafter, also referred to as a "core end portion 62") is in contact with the bottom portion 14.

The magnetic flux transfer portion 65 is formed radially outward from the core end portion 62 over the entire circumference of the core end portion 62. Therefore, the magnetic flux transfer portion 65 is arranged between the bobbin 22 and the bottom portion 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom portion 14 of the yoke 10 and the plunger 30. The magnetic flux transfer portion 65 may transfer magnetic flux between the side surface portion 12 of the yoke 10 and the plunger 30. The magnetic flux transfer portion 65 of the present embodiment is formed integrally with the core portion 61. The magnetic flux transfer portion 65 and the core portion 61 may be integrated after being formed as separate bodies from each other. For example, the core portion 61 may be press-fitted into a through hole of the magnetic flux transfer portion 65 formed in a ring shape, or may be fixed by welding or the like after the core portion 61 is inserted into the through hole.

The magnetic flux transfer portion 65 is formed with a first facing surface 68 facing the bottom portion 14 of the yoke 10. In the present embodiment, the first facing surface 68 is formed in a planar shape along the radial direction. Further, in the following description, a portion of the bottom portion 14 facing the first facing surface 68 is also referred to as a "second facing surface 19". The second facing surface 19 is formed in a planar shape along the radial direction and is in contact with the first facing surface 68. A breathing groove 500 is formed on the second facing surface 19.

Figure 3:
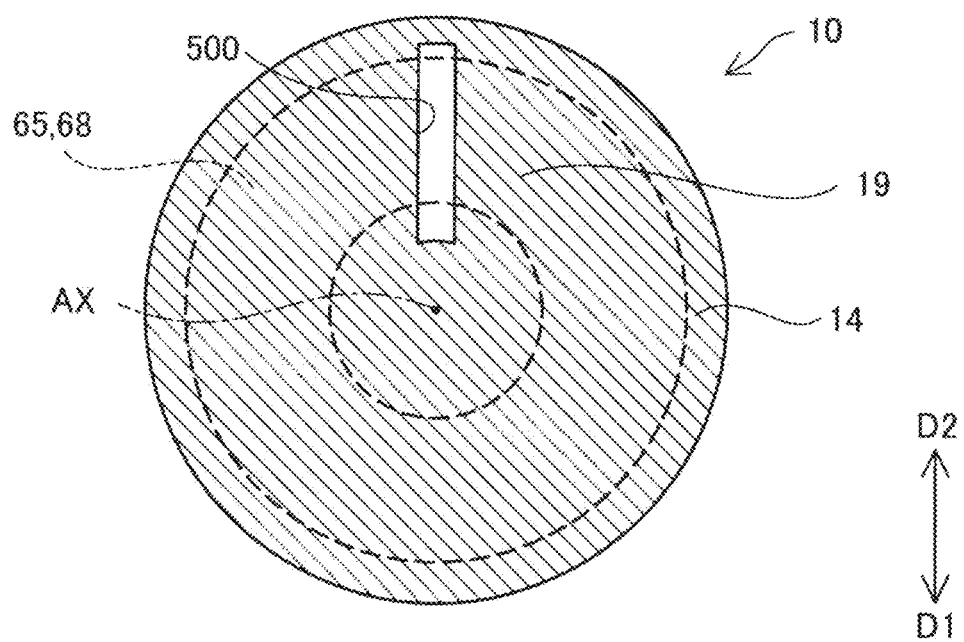
FIG. 3 is a cross-sectional view taken along a line III-III in FIG. 2.

In FIG. 3, for convenience of explanation, the position of the first facing surface 68 of the magnetic flux transfer portion 65 is shown by a broken line. As shown in FIG. 3, the breathing groove 500 communicates the inside and the outside of the magnetic flux transfer portion 65 in the radial direction. Therefore, as shown in FIG. 2, the plunger chamber 95 and the outside of the solenoid 100 are communicated with each other via the breathing groove 500 and the breathing path 28. With such a configuration, the pressure fluctuation of the plunger chamber 95 is suppressed due to the sliding of the plunger 30, and it is suppressed that the smooth sliding of the plunger 30 is hindered.

As shown in FIG. 3, the breathing groove 500 of the present embodiment has a linear groove shape formed along the radial direction. Further, the breathing groove 500 of the present embodiment is formed so as to be positioned in the vertical direction D2 in the assembled state. In the present embodiment, the "vertical direction D2" is not limited to the vertically upward direction indicated by the arrow in FIG. 3, but means a direction on the vertically upward direction side rather than the horizontal direction. Therefore, the breathing groove 500 is formed in the assembled state along the direction rotated at an angle of less than 90° with respect to the vertically upward direction. As shown in FIG. 2, the breathing groove 500 of the present embodiment is formed at a position rotated by about 180° in the circumferential direction with respect to the connector 26 and the notch 18.

The fluid such as hydraulic oil existing in the mounting environment of the solenoid 100 may contain foreign matter such as abrasion powder. Such foreign matter may enter the breathing path 28 through the notch 18. The solenoid 100 of the present embodiment is formed so that the breathing groove 500 is positioned in the vertical direction D2 in the assembled state. Therefore, a passage path for the foreign matter flowing into the breathing path 28 from the notch 18 located in the ground direction D1 to reach the breathing groove 500 located in the vertical direction D2 is set to be relatively long. In the present embodiment, the foreign matter that has flowed into the breathing path 28 from the notch 18 located in the ground direction D1 needs to go around the breathing path 28 in the circumferential direction by half a circumference in order to reach the breathing groove 500 located in the vertical direction D2. As described above, since the path through which is the foreign matter passes has a so-called maze structure, the foreign matter flowing into the breathing path 28 is suppressed from entering the plunger chamber 95. In the present embodiment, the "maze structure" means a structure that forms a path that is more complicated and has a longer path length than a linear path.

A magnetic flux passage suppressing portion 70 shown in FIG. 2 is formed between the magnetic attraction core 50 and the core portion 61 in the axial direction AD. The magnetic flux passage suppressing portion 70 suppresses the flow of magnetic flux directly between the core portion 61 and the magnetic attraction core 50. The magnetic flux passage suppressing portion 70 of the present embodiment is configured such that a radial thickness of the stator core 40 is formed to be thin, so that the magnetic resistance of the magnetic flux passage suppressing portion 70 is higher than that of the magnetic attraction core 50 and the core portion 61.

The ring member 80 is arranged between the coil portion 20 and the flange 216 of the spool valve 200 in the axial direction AD. In other words, the ring member 80 is disposed radially outward of an end of the magnetic attraction core 50 of the stator core 40 (described later) in the axial direction AD, and an end opposite to the plunger 30 side. The end is hereinafter also referred to as "magnetic attraction core end 54". The ring member 80 has a ring-like external shape and is made of a magnetic metal. The ring member 80 transfers a magnetic flux between the magnetic attraction core 50 of the stator core 40 and the side surface portion 12 of the yoke 10. The ring member 80 is configured to be displaceable in the radial direction. As a result, variations in the dimensions of the stator core 40 during manufacture and imperfect alignment of the stator core 40 during assembly are absorbed. In the present embodiment, the magnetic attraction core 50 is press-fitted into the ring member 80. The magnetic attraction core 50 may be fitted to the ring member 80 with a slight radial gap instead of the press-fitting.

The elastic member 420 is accommodated in an elastic member accommodating portion 218 formed in the sleeve 210 of the spool valve 200 and urges the stator core 40 toward the bottom portion 14. The elastic member 420 is disposed in contact with an end surface (hereinafter, also referred to as the "end surface 56") of the magnetic attraction core 50 in the axial direction AD and opposite to the plunger 30 side. In the present embodiment, the elastic member 420 is configured by a compression coil spring having a substantially cylindrical external shape. The spool 220 is inserted radially inside the elastic member 420, Since the stator core 40 is urged in the axial direction AD toward the bottom portion 14 of the yoke 10 by the elastic member 420, the first magnetic flux transfer portion 65 is pressed against the bottom portion 14, and the magnetic flux transfer portion 65 is pressed to the bottom portion 14. Therefore, the loss of the magnetic flux transmitted from the bottom portion 14 of the yoke 10 to the magnetic flux transfer portion 65 is suppressed.

In the present embodiment, the ring member 80, the yoke 10, the plunger 30, and the stator core 40 are each made of iron. They are not limited to iron, they may be composed of any magnetic material such as nickel and cobalt. In the present embodiment, plating is applied on the outer peripheral surface of the plunger 30. By such a plating treatment, the surface hardness of the plunger 30 can be increased, and deterioration of slidability can be suppressed. Further, in the present embodiment, the yoke 10 is formed by press molding and the stator core 40 is formed by forging, but each may be formed by any molding method. For example, the yoke 10 may be integrated by caulking fixing, press-fitting fixing, or the like after the side surface portion 12 and the bottom portion 14 are formed separately from each other.

FIGS. 1 and 2 show a state in which the plunger 30 is farthest from the magnetic attraction core 50 without energizing the coil 21. Unlike the states shown in FIGS. 1 and 2, when the coil 21 is energized, a magnetic circuit C1 is formed inside the solenoid 100. The plunger 30 is drawn toward the magnetic attraction core 50 by the formation of the magnetic circuit C1 and slides on the inner peripheral surface of the core portion 61 in the axial direction AD. As the current flowing through the coil portion 20 increases, the magnetic flux density of the magnetic circuit C1 increases, and the stroke amount of the plunger 30 increases.

When the plunder 30 moves toward the magnetic attraction core 50, the shaft 90 abutting on the distal end surface 32 of the plunger 30 presses the spool 220 shown in FIG. 1 toward the spring 230. As a result, the opening area of the oil port 214 is adjusted, and a hydraulic pressure proportional to the value of the current flowing through the coil 21 is output.

In the sliding core 60 of the present embodiment, the core portion 61 and the magnetic flux transfer portion 65 are integrally formed. Therefore, there is almost no radial gap between the core portion 61 and the magnetic flux transfer portion 65, and it is possible to prevent the core portion 61 and the magnetic flux transfer portion 65 from being eccentric. Therefore, when a magnetic circuit C1 is formed by energization, it is possible to suppress the occurrence of radial bias in the distribution of the magnetic flux transmitted from the magnetic flux transfer portion 65 to the core portion 61, and suppress the occurrence of radial bias in the distribution of the magnetic flux transmitted from the core portion 61 to the plunger 30. In other words, according to the solenoid 100 of the present embodiment, the magnetic flux densities of the magnetic circuit C1 can be made substantially equal in the circumferential direction. Therefore, it is possible to suppress an increase in side force due to a bias in the distribution of magnetic flux, and it is possible to suppress deterioration of the slidability of the plunger 30.

In the present embodiment, the magnetic flux transfer portion 65 corresponds to the first magnetic flux transfer portion in the present disclosure, the ring member 80 corresponds to the second magnetic flux transfer portion in the present disclosure, and the notch 18 corresponds to the inflow portion in the present disclosure.

According to the solenoid 100 of the first embodiment described above, the sliding core 60 has the tubular core portion 61 arranged radially outside the plunger 30 and the magnetic flux transfer portion 65 formed from the core end portion 62 of the core portion 61 toward the outside in the radial direction to transfer the magnetic flux. Therefore, there is almost no radial gap between the core portion 61 and the magnetic flux transfer portion 65. It is possible to prevent the core portion 61 and the magnetic flux transfer portion 65 from being eccentric. Therefore, due to such eccentricity, it is possible to suppress the occurrence of radial bias in the distribution of the magnetic flux transmitted from the magnetic flux transfer portion 65 to the plunger 30 via the core portion 61. Therefore, it is possible to suppress an increase in side force due to a bias in the distribution of magnetic flux.

In addition, the breathing groove 500 that communicates the inside and outside of the magnetic flux transfer portion 65 in the radial direction is formed on the second facing surface 19 facing the magnetic flux transfer portion 65 at the bottom portion 14 of the yoke 10, and also formed so as to be positioned in the vertical direction D2 in the assembled state. Further, the notch 18 serving as the inflow port of the foreign matter flowing into the breathing path 28 is formed so as to be positioned in the ground direction D1 in the assembled state. That is, the notch 18 is formed in a direction different from that of the breathing groove 500. With such a configuration, a long-path maze structure can be realized as the structure of the breathing path 28. Therefore, it is possible to prevent foreign matter flowing into the breathing path 28 from entering the plunger chamber 95, and it is possible to prevent deterioration of the slidability of the plunger due to the inflow of foreign matter into the plunger chamber 95. As described above, according to the solenoid 100 of the first embodiment, it is possible to suppress the entry of foreign matter into the plunger chamber 95 while suppressing the increase in the side force of the solenoid 100.

Further, since the breathing groove 500 is formed on the second facing surface 19 of the bottom portion 14 of the yoke 10, the circumferential position of the breathing groove 500 with respect to the notch 18 which is the inflow port of the foreign matter flowing into the breathing path 28 can be determined only by the yoke 10. Therefore, it is possible to easily realize a configuration in which the breathing groove 500 is positioned in the vertical direction D2 in the assembled state, and it is possible to omit the step of adjusting the position of the breathing groove 500 in the circumferential direction when assembling the solenoid 100.

B. Second Embodiment

Figure 4:
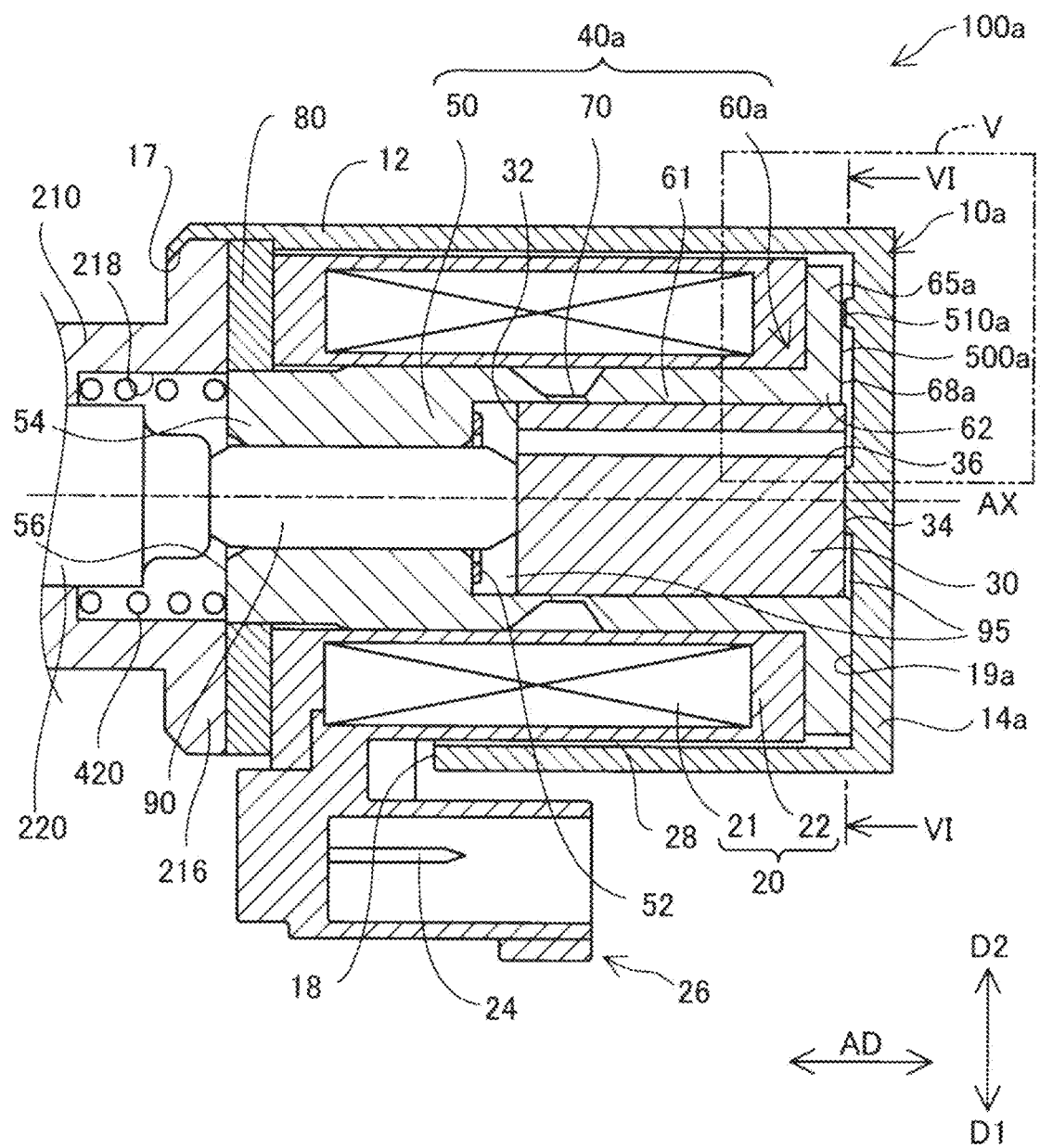
FIG. 4 is a cross-sectional view showing a detailed configuration of a solenoid according to a second embodiment.

The solenoid 100a of the second embodiment shown in FIG. 4 is different from the solenoid 100 of the first embodiment in that a yoke 10a and a stator core 40a are provided in place of the yoke 10 and the stator core 40. More specifically, in the solenoid 100 of the first embodiment, a breathing groove 500a is formed on the first facing surface 68a of the magnetic flux transfer portion 65a instead of the breathing groove 500 formed on the second facing surface 19 of the yoke 10. Since the other configurations are the same as those of the solenoid 100 of the first embodiment, the same configurations are designated by the same reference numerals, and detailed description thereof will be omitted.

Figure 5:
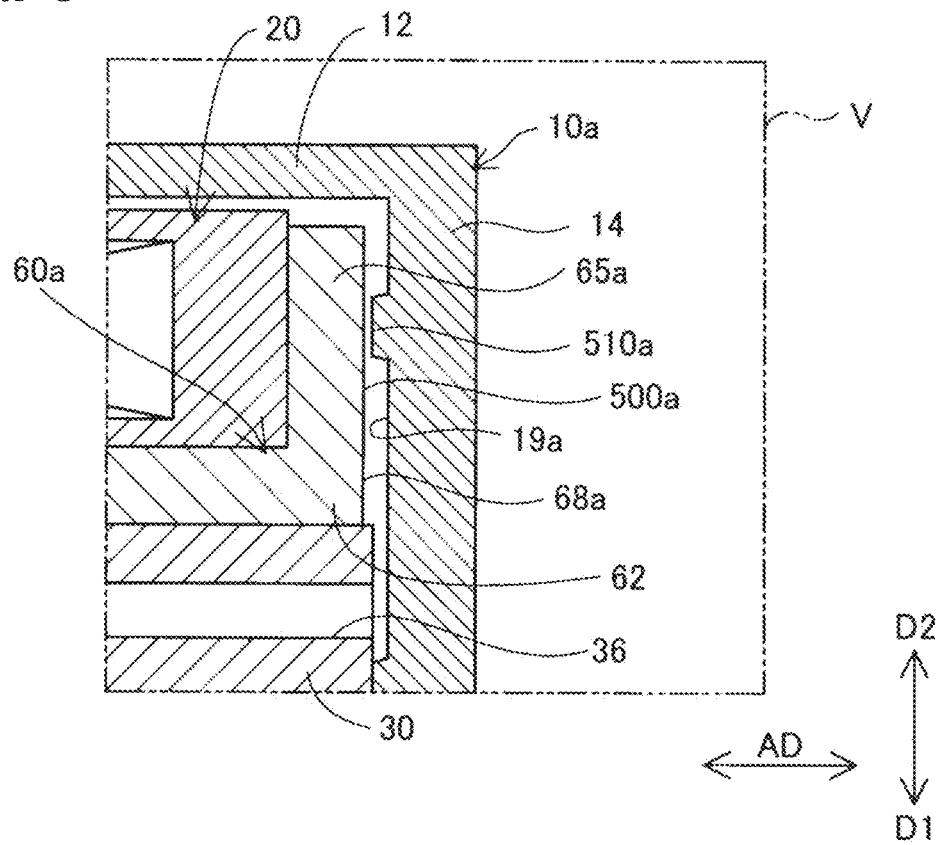
FIG. 5 is an enlarged cross-sectional view showing an area V of FIG. 4.
Figure 6:
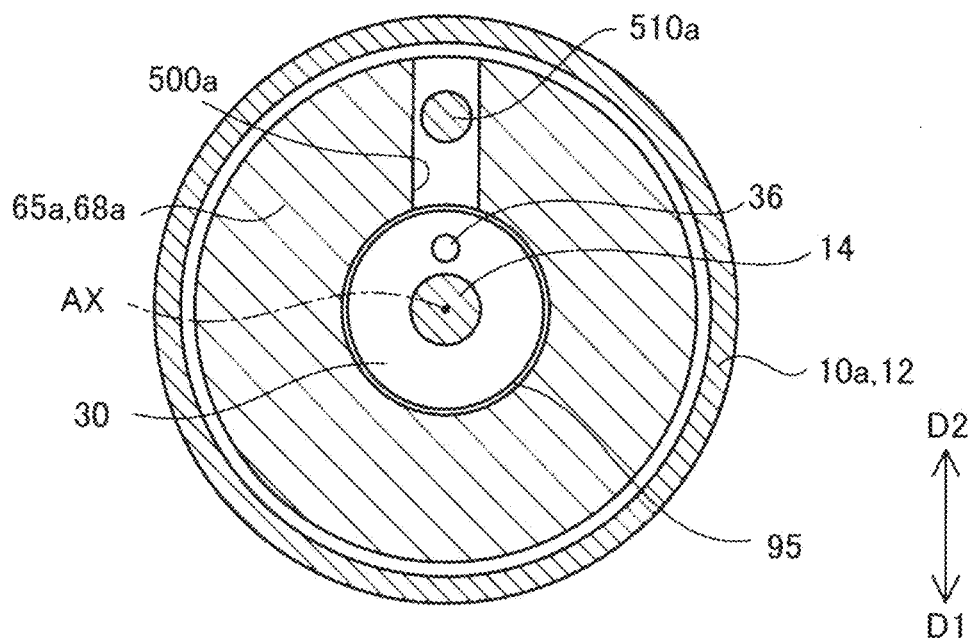
FIG. 6 is a cross-sectional view taken along line VI-VI of FIG. 4.

As shown in FIGS. 4 to 6, the breathing groove 500a is formed on the first facing surface 68a in the magnetic flux transfer portion 65a of the sliding core 60a included in the stator core 40a of the second embodiment. As shown in FIG. 6, the breathing groove 500a has a linear groove shape formed along the radial direction.

As shown in FIG. 5, a protruding portion 510a that protrudes toward the first facing surface 68a in the axial direction AD is formed on the second facing surface 19a of the bottom portion 14a included in the yoke 10a of the second embodiment. As shown in FIG. 6, the protruding portion 510a is formed so as to be positioned in the vertical direction D2 in the assembled state. In the present embodiment, the protruding portion 510a is formed at a position rotated by about 180° in the circumferential direction with respect to the connector 26 and the notch 18 shown in FIG. 4. The protruding portion 510a has a diameter smaller than the width of the breathing groove 500a and engages with the breathing groove 500a formed on the first facing surface 68a. By such engagement, the circumferential positions of the stator core 40a and the breathing groove 500a with respect to the yoke 10a are determined.

According to the solenoid 100a of the second embodiment described above, the same effects as that of the first embodiment are obtained. In addition, since the protruding portion 510a that engages with the breathing groove 500a is formed on the second facing surface 19a, the circumferential position of the breathing groove 500a with respect to the yoke 10a can be fixed. Therefore, it is possible to omit adjusting the circumferential position of the sliding core 60a when assembling the solenoid 100a, and it is possible to easily realize a configuration in which the breathing groove 500a is positioned in the vertical direction D2 in the assembled state.

C. Third Embodiment

Figure 7:
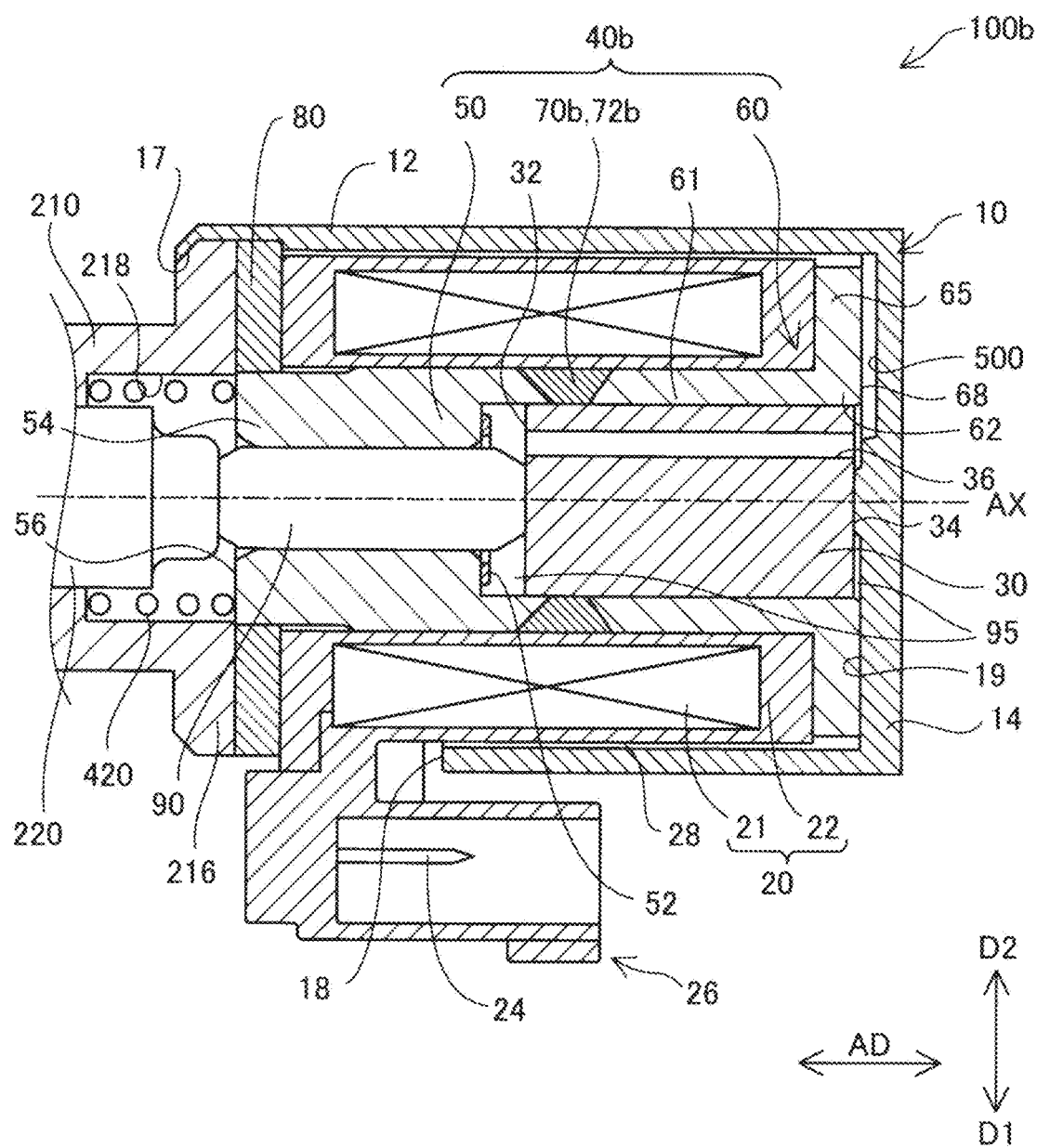
FIG. 7 is a cross-sectional view showing a detailed configuration of a solenoid according to a third embodiment.

A solenoid 100b of a third embodiment shown in FIG. 7 is different from the solenoid 100 of the first embodiment in that it includes a stator core 40b having a magnetic flux passage suppressing portion 70b instead of the magnetic flux passage suppressing portion 70. Since the other configurations are the same as those of the solenoid 100 of the first embodiment, the same configurations are designated by the same reference numerals, and detailed description thereof will be omitted.

The magnetic flux passage suppressing portion 70b in the solenoid 100b of the third embodiment includes a connecting portion 72b formed of a non-magnetic material. The connecting portion 72b physically connects the magnetic attraction core 50 and the sliding core 60, which are formed as separate bodies from each other. In the present embodiment, the connecting portion 72b has a wall thickness substantially equal to that of the core portion 61, and is formed by brazing or the like. Further, in the present embodiment, the connecting portion 72b is formed of austenitic stainless steel, but is not limited to austenitic stainless steel, and may be formed of any non-magnetic material such as aluminum or brass.

According to the solenoid 100b of the third embodiment described above, the same effects as that of the first embodiment are obtained. In addition, since the magnetic flux passage suppressing portion 70b includes the connecting portion 72b formed of a non-magnetic material, when energized, it is possible to further suppress the direct passage of the magnetic flux from the core portion 61 to the magnetic attraction core 50 without passing through the plunger 30. Further, since the connecting portion 72b is formed to have a wall thickness substantially equal to that of the core portion 61, the magnetic attraction core 50 and the core portion 61 can be more firmly connected, and the plunger 30 also slides in the connecting portion 72b.

D. Fourth Embodiment

Figure 8:
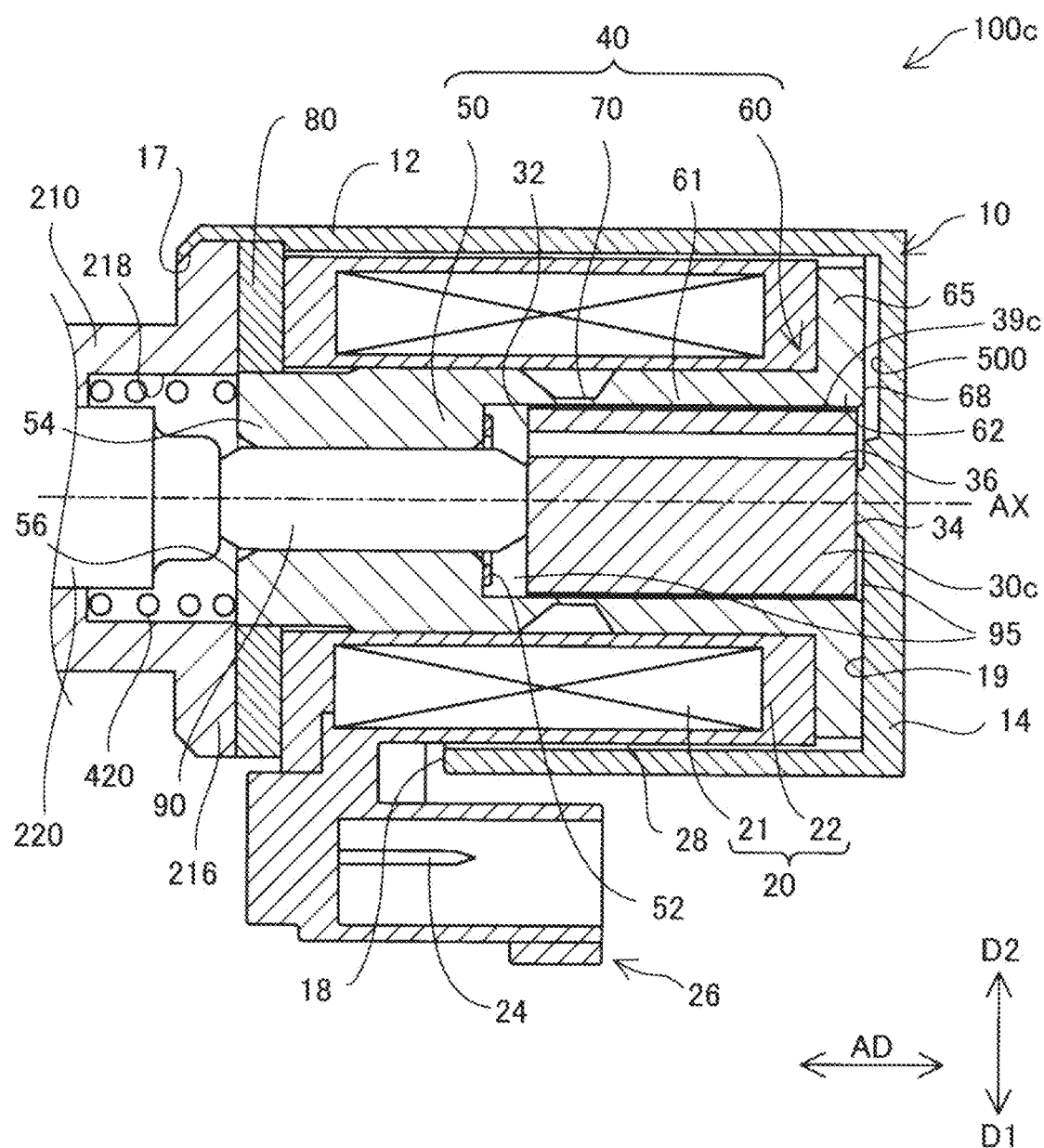
FIG. 8 is a cross-sectional view showing a detailed configuration of a solenoid according to a fourth embodiment.

A solenoid 100c of a fourth embodiment shown in FIG. 8 is different from the solenoid 100 of the first embodiment in that the plunger 30c is provided in place of the plunger 30. Since the other configurations are the same as those of the solenoid 100 of the first embodiment, the same configurations are designated by the same reference numerals, and detailed description thereof will be omitted.

In the plunger 30c of the fourth embodiment, a plating treatment of the outer peripheral surface is omitted, and the outer peripheral surface is covered with a film member 39c. The film member 39c is formed of a Teflon sheet (Teflon is a registered trademark) and is wound around a plunger 30c. In addition, it is not limited to Teflon and may be formed of any other non-magnetic material. Further, the film member 39c of the present embodiment covers the plunger 30c over the entire length of the plunger 30c in the axial direction AD on the outer peripheral surface, that is, the radially outer surface of the plunger 30c. The film member 39c is not limited to the entire length of the plunger 30c in the axial direction AD, and may cover a part of the outer peripheral surface of the plunger 30c including the sliding portion of the plunger 30c.

According to the solenoid 100c of the fourth embodiment described above, the same effect as that of the first embodiment is obtained. In addition, since the film member 39c formed of a non-magnetic material and covering at least a part of the outer peripheral surface of the plunger 30c is further provided, the plating process of the outer peripheral surface of the plunger 30c can be omitted, and it is possible to suppress an increase in the cost required for manufacturing the plunger 30c.

E. Other Embodiments (1) The configurations of the breathing grooves 500 and 500a in each of the above embodiments are merely examples and can be changed in various ways. For example, the breathing grooves 500 and 500a are not limited to a linear groove shape along the radial direction, and may have an arbitrary groove shape such as a curved shape or a wavy shape. Any number of grooves may be formed side by side in the circumferential direction. Further, the breathing grooves 500 and 500a may be formed on both the first facing surfaces 68 and 68a of the magnetic flux transfer portions 65 and 65a and the second facing surfaces 19 and 19a of the bottom portions 14 and 14a, respectively. That is, in general, the breathing grooves 500 and 500a that communicate the inner and outer sides of the first magnetic flux transfer portion may be formed on at least one of the first facing surfaces 68 and 68a and the second facing surfaces 19 and 19a so as to be positioned in the vertical direction when the solenoid 100 and 100a to 100c is assembled. Even with such a configuration, the same effect as that of each of the above described embodiments can be obtained.

(2) In the solenoid 100a of the second embodiment, the protruding portion 510a is formed on the second facing surface 19a, but the protruding portion 510a may be omitted. In such a configuration, the breathing groove 500a can be directed to the vertical direction D2 by adjusting the circumferential position of the sliding core 60a when assembling the solenoid 100a.

(3) The configurations of the solenoids 100, 100a to 100c of each of the above embodiments are merely examples and can be changed in various ways. For example, in place of the notch 18, or in addition to the notch 18, any through hole radially formed in the side surfaces portion 12 of the yokes 10 and 10a may function as an inflow portion of the fluid existing in the mounting environment of the solenoids 100, 100a to c. Further, for example, the core portion 61 of the sliding cores 60, 60a and the magnetic flux transfer portions 65, 65a may be formed separately from each other. In such a configuration, the core portion 61 may be press-fitted into the inner hole of the magnetic flux transfer portions 65, 65a formed in an annular shape. Further, for example, the elastic member 420 is not limited to the compression coil spring, and may be composed of any elastic member such as a disc spring or a leaf spring. The elastic member 420 may be arranged between the coil portion 20 and the magnetic flux transfer portions 65, 65a in the axial direction AD instead of the elastic member accommodating portion 218 to urge the magnetic flux transfer portions 65, 65a. Even with such a configuration, the same effect as that of each of the above described embodiments can be obtained.

(4) In the solenoid 100b of the third embodiment, the connecting portion 72b is formed to have a wall thickness substantially equal to that of the core portion 61, but is formed to be thinner than the core portion 61 and may physically connect between the magnetic attraction core 50 and the sliding cores 60, 60a on the inner peripheral surface of the coil portion 20. Even with such a configuration, the same effect as that of the third embodiment can be obtained.

(5) In the solenoid 100c of the fourth embodiment, the sheet-shaped film member 39c is wound around the plunger 30c, but the film member 39c is formed not only by winding the sheet but also by coating the outer peripheral surface of the plunger 30c. Further, since the inner peripheral surface of the sliding cores 60, 60a is coated with a non-magnetic material, at least a part of the outer peripheral surface of the plunger 30c may be covered with the film member 39c. Even with such a configuration, the same effect as that of the fourth embodiment can be obtained.

(6) The solenoids 100, 100a to 100c of each of the above embodiments are assembled so that the positions of the connector 26 and the notch 18 in the circumferential direction are in the ground direction D1, but the solenoids are not limited to be positioned in the ground direction D1 and are positioned in any direction. Further, the notch 18 may be formed in a direction different from that of the breathing grooves 500 and 500a. Even with such a configuration, foreign matter that has flowed into the inside of the yokes 10 and 10a from the outside of the solenoids 100 and 100a to 100c through the notch 18 passes through a relatively long path to reach the breathing grooves 500 and 500a, therefore, it is possible to suppress the entry of foreign matter into the plunger chamber 95. Further, the position of the notch 18 in the circumferential direction may be formed in the vertical direction D2, or may be formed in the same direction as the breathing grooves 500 and 500a. In such a configuration, a foreign matter contained in a fluid such as air falls vertically downward according to gravity and passes through a long path in order to reach the breathing grooves 500 and 500a located in the vertical direction D2. Therefore, it is possible to suppress the entry of foreign matter into the plunger chamber 95.

(7) The solenoids 100, 100a to 100c of each of the above embodiments are applied to the linear solenoid valve 300 for controlling the hydraulic pressure of the hydraulic oil supplied to the automatic transmission for vehicles, and function as an actuator for driving the spool valve 200. However, the present disclosure is not limited to this configuration. For example, the solenoid is not limited to being mounted on the valve body provided on the outer surface of the transmission case, but may be mounted on any hydraulic device that requires control of hydraulic pressure. Further, for example, instead of the spool valve 200, an arbitrary valve such as a poppet valve may be driven, and instead of the valve, an arbitrary driven body such as a switch may be driven.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:
1. A solenoid, comprising:
a coil portion configured to generate a magnetic force when energized;
a yoke including a side surface portion along an axial direction and a bottom portion formed along a direction intersecting the axial direction, and being configured to accommodate the coil portion;
a columnar plunger that slides in the axial direction;
a stator core including
a magnetic attraction core arranged in the axial direction to face a distal end surface of the plunger and configured to attract magnetically the plunger by a magnetic force generated by the coil portion,
a sliding core having a tubular core portion arranged inside the coil portion in a radial direction orthogonal to the axial direction and accommodating the plunger, and a first magnetic flux transfer portion formed from a core end portion which is an axial end portion of the core portion and faces the bottom portion toward an outside in the radial direction so as to transfer magnetic flux between the yoke and the core portion, and a magnetic flux passage suppressing portion configured to suppress passage of magnetic flux between the sliding core and the magnetic attraction core; and a second magnetic flux transfer portion that is disposed radially outside a magnetic attraction core end, which is an end in the axial direction of the magnetic attraction core and is opposite to a side facing the distal end surface, and is configured to transfer the magnetic flux between the magnetic attraction core and the side surface portion, wherein a first facing surface faces the bottom portion in the first magnetic flux transfer portion, and a breathing groove communicating an inside and an outside of the first magnetic flux transfer portion in the radial direction is formed on a second facing surface facing the first magnetic flux transfer portion at the bottom portion so as to be positioned in a vertical direction when the solenoid is assembled.

2. The solenoid according to claim 1, wherein
an inflow portion that allows a fluid existing in a mounting environment of the solenoid to flow from the outside of the solenoid into the inside of the solenoid is formed in a direction different from that of the breathing groove.

3. The solenoid according to claim 1, wherein
the magnetic flux passage suppressing portion includes a non-magnetic connecting part that physically connects the magnetic attraction core and the sliding core which are formed separately from each other.

4. The solenoid according to claim 1, further comprising:
a film member being formed of a non-magnetic material and configured to cover at least a part of an outer peripheral surface of the plunger.

5. The solenoid according to claim 1, wherein
the breathing groove is formed only on the second facing surface.

* * * * *